(12) United States Patent
Stenersen et al.

(10) Patent No.: US 6,384,369 B1
(45) Date of Patent: May 7, 2002

(54) LIQUID FILTER CONSTRUCTION AND METHODS

(75) Inventors: Eivind Stenersen, River Falls, WI (US); David B. Harder, Burnsville, MN (US); John R. Hacker; Gerald D. Kiral, both of Bloomington, MN (US); Ronald W. Streitmatter, Champaign; Kevin K. Socha, Peoria, both of IL (US)

(73) Assignees: Donaldson Company, Inc., Minneapolis, MN (US); Caterpillar, Inc., Peoria, IL (US)

( * ) Notice: Subject to any disclaimer, the term of this patent is extended or adjusted under 35 U.S.C. 154(b) by 26 days.

(21) Appl. No.: 09/653,653

(22) Filed: Sep. 1, 2000

Related U.S. Application Data

(60) Provisional application No. 60/229,348, filed on Sep. 22, 1999.

(51) Int. Cl.[7] ............................................... B23K 26/00
(52) U.S. Cl. ............................ 219/121.64; 219/121.85; 219/121.16
(58) Field of Search ...................... 219/121.64, 121.63, 219/121.6, 121.85; 210/168

(56) References Cited

U.S. PATENT DOCUMENTS

| | | |
|---|---|---|
| 2,884,133 A | 4/1959 | Walulik et al. |
| 3,297,162 A | 1/1967 | Mouwen |
| 4,231,488 A | 11/1980 | Ward et al. |
| 4,320,847 A | 3/1982 | Gesser et al. |
| 4,505,816 A | 3/1985 | Wozniak et al. |
| 4,673,814 A | 6/1987 | Schroeder et al. |
| 4,719,012 A | 1/1988 | Groezinger et al. |
| 4,743,374 A | 5/1988 | Stifelman |
| 4,854,467 A | 8/1989 | Büdenbender |
| 4,859,328 A | 8/1989 | Groezinger et al. |
| 4,883,083 A | 11/1989 | Fisher et al. |
| 4,969,994 A | 11/1990 | Misgen et al. |
| 5,037,539 A | 8/1991 | Hutchins et al. |

(List continued on next page.)

FOREIGN PATENT DOCUMENTS

| | | |
|---|---|---|
| EP | 0 099 472 A2 | 2/1984 |
| EP | 0 255 591 A1 | 2/1988 |
| EP | 0 858 823 A1 | 8/1998 |
| FR | 2544021 | 10/1984 |
| WO | WO 93/16315 | 8/1993 |

OTHER PUBLICATIONS

Declaration of Eivind Stenersen with Exhibits A1–D3.

*Primary Examiner*—M. Alexandra Elve
(74) *Attorney, Agent, or Firm*—Merchant & Gould P.C.

(57) ABSTRACT

Liquid filter constructions include a baffle plate secured to a can, by way of laser welding. A filter element is operably oriented within the interior of the can. The filter element includes a first end cap and a media pack secured to the first end cap. In some embodiments, the first end cap radially abuts an outer, annular surface of a tubular member of the baffle plate to form a radially directed seal between the first end cap and the tubular member. Liquid filter constructions of this type have a burst strength between 500–800 psi (about 3.4–5.5 MPa), along a longitudinal section of the can wall. Constructions of this type eliminate a roll or lock seam, an inner gasket, an inner compressive spring, and a gasket retainer. Systems for using liquid filters are described herein. Methods of constructing and using these types of filter arrangements are also described.

5 Claims, 10 Drawing Sheets

U.S. PATENT DOCUMENTS

| | | |
|---|---|---|
| 5,100,014 A | 3/1992 | Shiozawa |
| 5,104,537 A | 4/1992 | Stifelman et al. |
| 5,116,499 A | 5/1992 | Deibel |
| 5,249,701 A | 10/1993 | Daehn |
| 5,336,405 A | 8/1994 | Tang et al. |
| 5,342,519 A | 8/1994 | Friedmann et al. |
| 5,395,518 A | 3/1995 | Gulsvig |
| 5,509,567 A | 4/1996 | Lindahl |
| 5,518,612 A | 5/1996 | Kayal et al. |
| 5,647,504 A * | 7/1997 | Gullett et al. ............... 220/612 |
| 5,830,348 A * | 11/1998 | Vannoy et al. .............. 210/109 |
| 6,086,752 A * | 7/2000 | Dell et al. .................. 210/109 |
| 6,193,833 B1 * | 2/2001 | Gizowski et al. ........ 156/272.8 |
| 6,213,143 B1 * | 4/2001 | Schwegler et al. .... 137/115.27 |

* cited by examiner

LIQUID FILTER CONSTRUCTION AND METHODS

Priority under 35 U.S.C. §119 (e) is claimed to provisional Application Ser. No. 60/229,348, filed Sep. 22, 1999, and entitled "LIQUID FILTER CONSTRUCTION AND METHODS." This provisional application was converted from a utility application having Ser. No. 09/401,104, filed Sep. 22, 1999. The complete disclosures of application Ser. No. 60/229,348 and utility application Ser. No. 09/401,104 are incorporated by reference herein.

FIELD OF THE INVENTION

This disclosure relates to fluid filters including their construction and use. In particular, this disclosure concerns liquid filters to clean contaminants from fluid systems such as engine and transmission lubrication systems, engine fuel systems, and hydraulic systems.

BACKGROUND

Certain types of fluid filters, for example oil or lube filters, fuel filters, or hydraulic fluid filters, operate to remove substantial amounts of particulate material from liquid flow, typically in a circulating environment.

Such filters generally include a filter element within a drawn, relatively thin, cylindrical metal housing and a stamped metal baffle or cover plate at the open end of the housing. Typically, there is a gasket retainer projection welded to the cover plate, and the gasket retainer is secured to the housing by a roll or lock seam. A central threaded opening is provided in the cover plate for spinning the filter onto a threaded stud of a mounting base or filter head.

Fluid filters of this type can be mathematically modeled to approximate pressure vessel systems. A typical pressure vessel system is mainly subject to two types of stresses—hoop stress and longitudinal stress. Hoop stress is calculated by multiplying the internal pressure times the radius and dividing that product by the wall thickness of the vessel. The hoop stress acts tangent to the surface of the pressure vessel. The longitudinal stress is the stress produced at right angles to the hoop stress (i.e., parallel to the longitudinal axis of the pressure vessel.) The longitudinal stress is calculated by multiplying the internal pressure times the radius and dividing that product by two times the wall thickness.

The longitudinal stress is one-half of the value of the hoop stress. In theoretically exact pressure vessel systems, when the pressure in the pressure vessel is raised to the bursting point, failure should occur along a longitudinal seam of the pressure vessel. In other words, this means that the system is optimized for burst strength if the failure point occurs at the longitudinal stress point. If, under a burst test, the system fails at some point other than along a longitudinal seam, this means that, theoretically, the system has not been optimized for strength.

In previous existing filters having a rolled lock joint connection between the gasket retainer and the housing, as pressure is increased to the point of mechanical failure, the failure typically occurs at the rolled lock joint. This failure point is often at pressures lower than the pressure point at which the pressure vessel should fail along a longitudinal seam.

In addition, in previous existing filters having a rolled lock joint connection between the gasket retainer and the housing, there are other problems as well. As discussed above, the baffle plate or cover is typically connected to the gasket retainer with projection welds. Sometimes, the projection welds can break due to vibration or pressure pulses. When the projection welds break, the filter cannot be spun off from the filter head.

Improvements in these types of filter systems are desirable.

SUMMARY OF THE DISCLOSURE

In one aspect, the disclosure describes a liquid filter construction including a cover plate or baffle plate attached to a can with a filter element operably oriented within an interior of the can. The baffle plate, in preferred constructions, will be metal, preferably steel, with an average cross-sectional thickness of at least about 0.080 inch (about 2 mm). In preferred constructions, the can will be metal, preferably steel, and will have an average cross-sectional wall thickness that is different from the thickness of the baffle plate, and is at least about 0.008 inch (about 0.2 mm). In certain arrangements, the baffle plate will be at least 200% of the thickness of the can. Preferably, the can will be secured to the baffle plate along a laser welded seam.

In preferred constructions, the filter element will include at least a first end cap and a media pack secured to the first end cap. The first end cap will radially abut an outer, annular surface of a tubular member forming either the inlet or outlet to formal a radially directed seal between the first end cap and the tubular member.

Filtration systems are disclosed that utilize liquid filter constructions as characterized herein. Filtration systems may comprise lubrication systems, fuel systems, or hydraulic systems. Such systems typically operate at pressures of no greater than about 200 psi (about 1.4 MPa) for lubrication systems and fuel systems. Hydraulic systems may be higher.

Methods for filtering liquid are disclosed and preferably utilize constructions and systems as characterized herein.

Methods of constructing a filter are also disclosed. Preferred methods will include laser welding a can to a baffle plate, wherein the can and baffle plate have dissimilar thicknesses.

DETAILED DESCRIPTION

A. Typical Systems of Operation.

Figure 1:
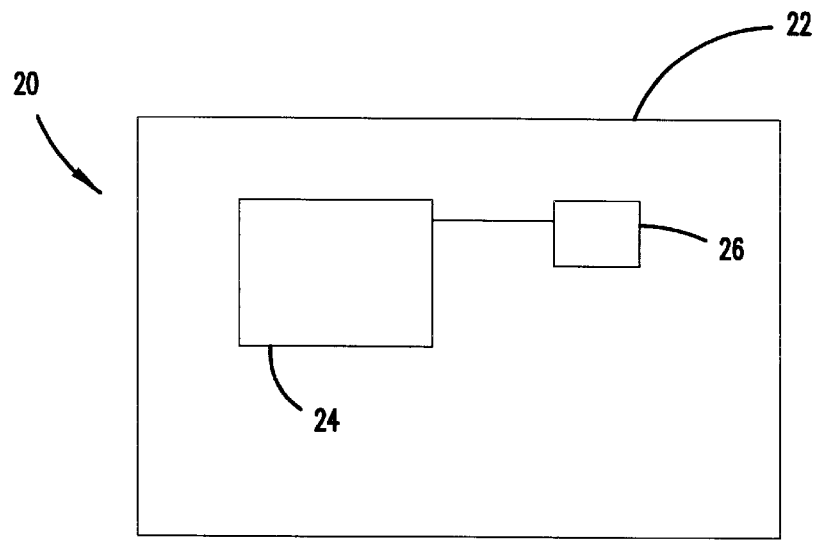
FIG. 1 is a schematic view of a typical system employing liquid filters, constructed according to principles of this disclosure.

In FIG. 1, a schematic diagram is illustrated showing a typical system and application for a filter assembly constructed according to principles disclosed herein. In FIG. 1, a system is depicted at 20. The system will include machinery 22 having an engine 24. The machinery 22 can be an excavator, a skid steer loader, a lift truck, a tractor, an over the highway truck, a power boat, a power plant, and other types of machines and equipment. Machinery 22 will have engines 24 to power machinery 22 in a variety of sizes and power. Engine 24 will include a lube system or a fuel system that requires cleaning by a filter assembly 26. Typical preferred systems 20 will include filter assemblies 26 that have typical operating pressures of less than about 200 psi (about 1.4 MPa) and impulse fatigue pressures of 0–175 psi (about 1.20 MPa) at 250,000 cycles. Systems 20 will have a variety of engine sizes including sizes typically at least 10 hp, typically no greater than about 900 hp (about 670 KW), and in many systems about 50–400 hp (about 30–300 KW).

Machinery 22 can also have hydraulic systems, in which the hydraulic fluid will need filtering or cleaning. These types of systems will use filter assembly 26 to clean the hydraulic fluid. Filter assemblies 26 that are used for cleaning hydraulic fluid will have typical operating pressures of less than about 1,000 psi (about 6.9 MPa) and typical impulse fatigue pressures of 500 psi (about 3.4 MPa) at $10^6$ cycles.

B. The Embodiment of FIGS. 2 and 3.

Figure 2:
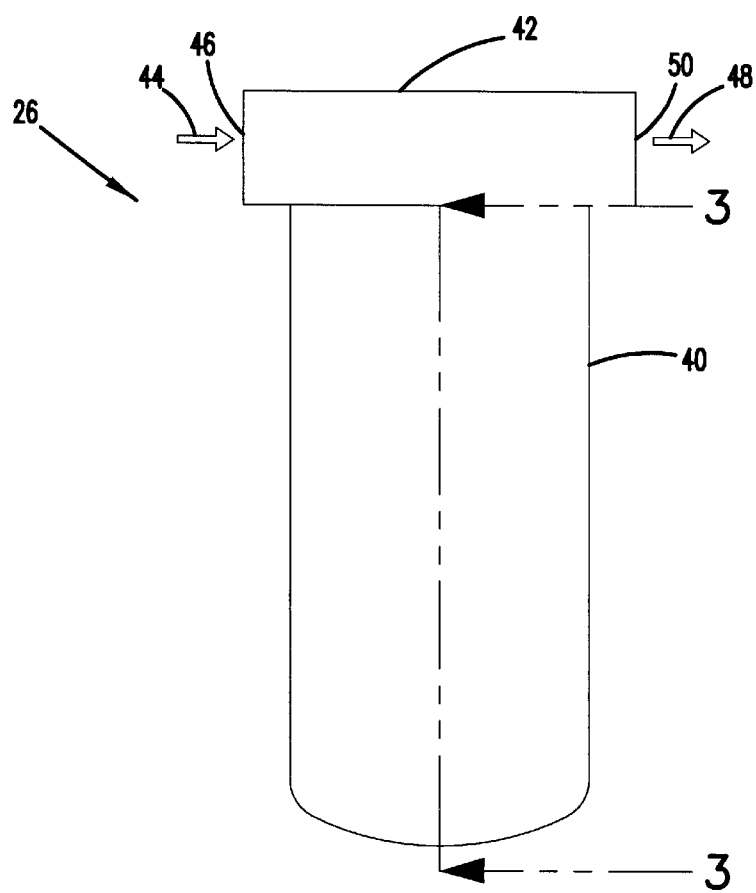
FIG. 2 is a schematic, front elevational view of one embodiment of a liquid filter cartridge mounted on a filter head, constructed according to principles of this disclosure.

Attention is now directed to FIG. 2. In FIG. 2, a filter assembly 26 is illustrated schematically, in front elevation. The assembly 26 includes a fluid filter construction or cartridge 40 mounted on a filter head or base 42. Assume, for example, that assembly 26 is constructed as an oil filter. Oil to be filtered would generally enter filter base 42 in the direction of arrow 44 through entrance port 46. The fluid flow would be directed through cartridge 40, for filtering in a preferred manner as described below. The filtered oil would then pass back into filter head 42 and outwardly therefrom, in the direction indicated generally by arrow 48 through exit port 50. The entrance port 46 and exit port 50 would be constructed, configured, and positioned appropriately for connection with suitable couplings and fluid flow conduits. Periodically, filter cartridge 40 is dismounted from base or head 42 for servicing. Typically, engagement between the filter cartridge 40 and the head 42 is threaded, with the cartridge 40 being a spin-on filter. Spin-on arrangements are common. In many instances, cartridge 40 would be designed to be removable and replaceable. That is, periodically cartridge 40 is replaced with a new or refurbished cartridge.

Figure 3:
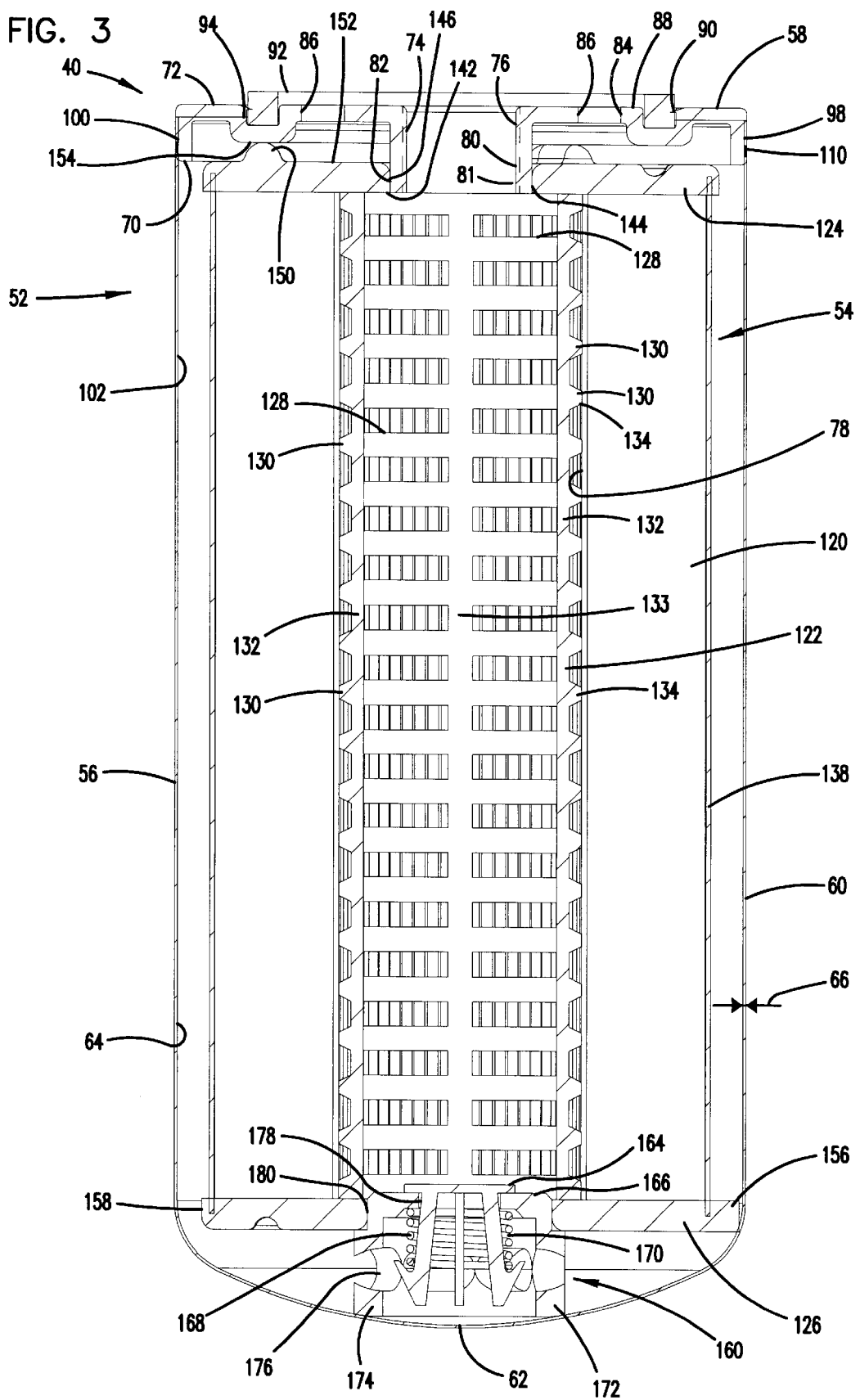
FIG. 3 is a schematic, cross-sectional view of the filter cartridge of FIG. 2 taken along the line 3–3 of FIG. 2.

Attention is now directed to FIG. 3. FIG. 3 is a schematic representation of the filter cartridge 40 of FIG. 2, shown in cross-section. From a review of FIG. 3, it can be seen that the particular embodiment shown is a "forward flow" system. That is, during operation, fluid flow during filtering is from an exterior region of the filter element to an interior region. Such arrangements are conventionally known as "forward flow" arrangements, as opposed to "reverse flow" arrangements, i.e., arrangements in which the fluid flow is directed oppositely.

The preferred filter cartridge 40 includes a housing 52 and an internally positioned filter element 54. The filter housing 52 includes an outer can 56 and a cover plate or baffle plate 58.

In preferred constructions, the can 56 has a surrounding wall 60 that generally approximates a cylinder with a domed or rounded end wall 62 and defines an open interior 64. The interior 64 functions as a receptacle to receive and contain the filter element 54. Preferably, the wall 60 of the can 56 is thin, as compared to the overall radius of the can 56. Preferably, the wall 60 has an average cross-sectional thickness 66 of about one-tenth or less of the radius of the can 56. In more preferred embodiments, the average cross-sectional wall thickness 66 is at least about 0.3% and typically about 0.4–1.4% of the inner radius of the can 56. Preferred dimensions for the average cross-sectional wall thickness 66 is no greater than about 0.048 in. (about 1.2 mm), at least about 0.008 in. (about 0.2 mm), and typically about 0.015–0.020 in. (about 0.4–0.5 mm). By the term "average cross-sectional wall thickness", it is meant the thickness of the wall 60 at any given point. Manufacturing tolerances or other variations in material and process can cause the wall thickness to vary somewhat.

Preferably, the can 56 will be constructed from materials having high burst strength, yet be inexpensive. Preferred arrangements include metal. Most preferred arrangements will be steel. By "steel", it is meant an alloy of iron and between about 0.02 to 1.5% carbon, and may include one or more alloying metals as additives: chromium, nickel, tungsten, molybdenum, manganese, vanadium, cobalt, and zirconium. In preferred arrangements, one example of a usable steel is low carbon steel (i.e., about 0.02–0.3% carbon), having a drawing quality per ASTM A620.

Still in reference to FIG. 3, the baffle plate 58 preferably is a stamped metal plate including an outer circular rim 70, a cover region 72 being circumscribed by the rim 70, and an inner tubular member 74 being circumscribed by the cover region 72. The inner tubular member 74 defines an aperture 76 to permit liquid flow communication with an interior 78 of the filter element 54. In particular, the tubular member 74 includes a stem or neck 80 defining an outer, annular surface 82. In preferred arrangements, when the filter assembly 26 operates in a forward flow system, the tubular member 74 acts as an outlet tube to permit the flow of cleaned or filtered liquid from the filter interior 78 to the filter head 42, and ultimately to downstream components.

The baffle plate 58 is preferably constructed of stamped metal, preferably steel. In one example, the baffle plate 58 is constructed of cold rolled, low carbon steel having a thickness no greater than about 0.164 in. (about 4.2 mm), at least about 0.080 in. (about 2 mm), and typically about 0.102–0.105 in. (about 2.6–2.7 mm).

The baffle plate 58 may also be constructed of powdered metal. Powdered metal can be any of several types of metals (iron, aluminum, chromium, etc.) produced in a powdered form, pressed in a mold, and heated (sintered) at high temperature.

The baffle plate 58 also includes a plurality of flow ports 84 to permit liquid flow communication with the interior 64 of the can 56. In the arrangement depicted in FIG. 3, the flow ports 84 are in the form of apertures 86 defined by the cover region 72. When the filter assembly 26 is operating in a forward flow system, the apertures 86 permit the flow of unfiltered liquid from the filter head 42 through the flow ports 84, and into the interior 64 of the can 56. Typically, the apertures 86 will define an open area no greater than about 20%, typically about 5–10%, and at least about 1% of the perimeter area of the baffle plate 58.

Figure 7:
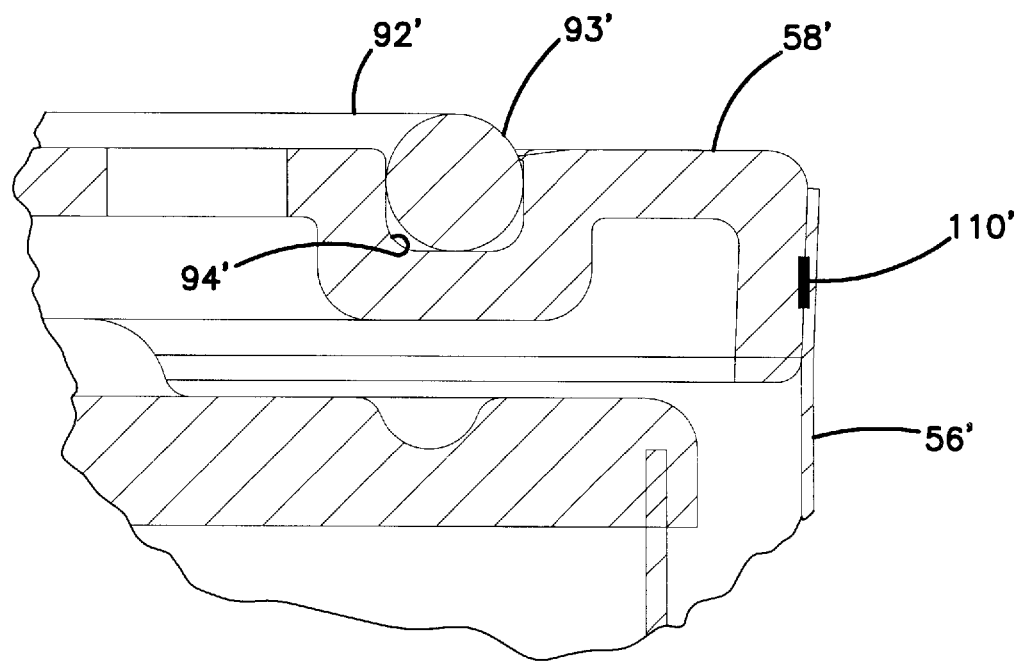
FIG. 7 is a fragmented, enlarged, cross-sectional view of an alternative embodiment of a seal member usable in a liquid filter cartridge.

The baffle plate 58 also preferably includes a seat 90 for holding or containing a seal member 92. In the preferred constructions, the seat 90 is defined by a groove, or indent, or channel 94 in the cover region 72. In the particular arrangement depicted in FIG. 3, the channel 94 is U-shaped. In preferred constructions, the seal member 92 is wedged into the channel 94 to form a tight, interference fit between the seal member 92 and the baffle plate 58. It can be seen in FIG. 3, that the channel 94 is in the cover region 72 between the outer rim 70 and the region 88 of the baffle plate 58 defining the apertures 86. An alternative embodiment is shown in FIG. 7. In FIG. 7, the seal member 92' is an O-ring 93'. The channel 94' permits the O-ring 93' to rotate with respect to the baffle plate 58' and with respect to the can 56'. A plurality of projecting tabs 95' aid in retaining the bring 93' in the channel 94'. In another embodiment, the gasket is arranged with respect to the baffle plate as an "outboard" gasket. This means that the gasket is arranged close to the outer periphery of the baffle plate (about 2–8 mm from the periphery of the baffle plate). Outboard gaskets are typically used for small filter cartridges, i.e., on the order of 3 inches (about 76 mm) or smaller.

Referring again to FIG. 3, in the arrangement shown, the seal member 92 is circular and circumscribes the flow ports 84. The seal member 92 is axially compressed against filter head 42 to form a seal between the filter head 42 and the filter cartridge 40. This seal helps to prevent leakage between the cartridge 40 and the filter head 42. In preferred constructions, the seal member 92 will be made from nitrile rubber.

The outer rim 70 forms and outer periphery 98 of the baffle plate 58. The outer periphery 98 includes an outer annular surface 100 that, in the preferred construction shown, snugly engages and abuts an inside surface 102 of the wall 60.

In the preferred construction shown, the baffle plate 58 is secured to the can 56 through a connection at the interface of the annular surface 100 and the inside surface 102 of the can 56. Preferably, the baffle plate 58 and the can 56 are secured together by laser welding to form a laser welded bead or seam 110 that fuses the baffle plate 58 and the can 56 together. By "laser welding", it is meant a process that applies heat in a concentrated region to melt the materials (i.e., the can 56 and baffle plate 58) in the concentrated region and cause fusion, upon cooling of the materials in the concentrated region. In this case, the heat application is preferably done with a laser. The laser welded seam 110 provides for a high strength connection or joint between the baffle plate 58 and the can 56. Indeed, when constructed according to most preferred arrangements described herein, when the filter cartridge 40 is subject to burst testing, preferred cartridges 40 will fail along a longitudinal line of the can wall 60, rather than at the joint between the baffle plate 58 and the can 56. This means that the filter cartridge 40 is approximating a pressure vessel system, and is being theoretically optimized for strength. Certain preferred laser welding techniques are described further below.

Figure 8:
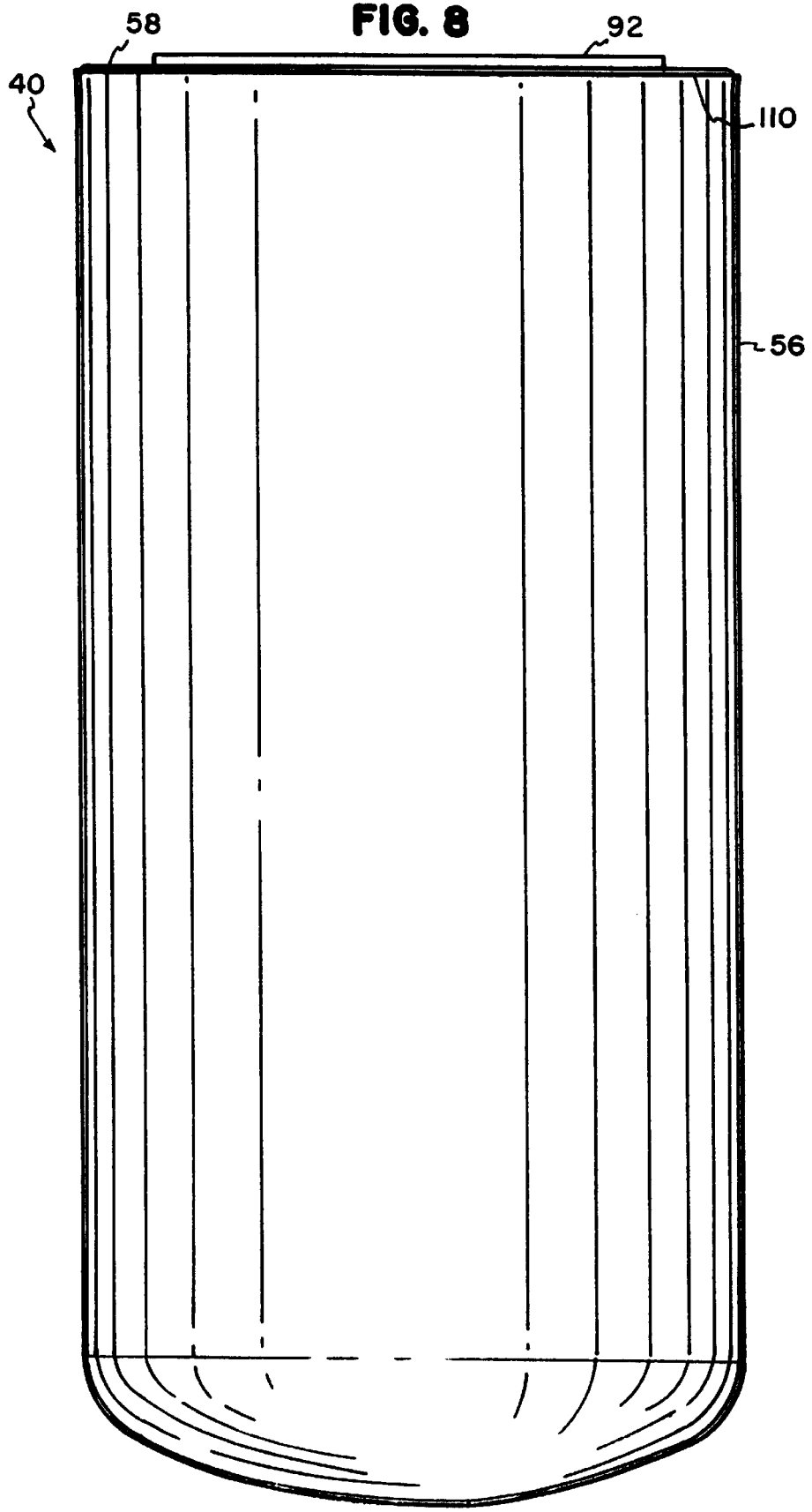
FIG. 8 is a side elevational view of a filter cartridge, constructed according to principles of this disclosure.

As a result of the seam 110, the outer appearance of the cartridge 40 is clean, attractive, and seamless, as can be seen in FIG. 8. Although the techniques described herein can be used to achieve a variety of appearances, the appearance in FIG. 8 is preferred due to its attractive, clean, eye-catching appearance.

Note that the way in which the can 56 and the baffle plate 58 are secured together eliminates roll or lock seams (i.e., the can 56 is "roll-seam free" or "lock seam free"). In the prior art, these roll or lock seams were typically the failure point when the filter cartridges were subject to burst testing and impulse fatigue testing. In prior art using roll or lock seams, the failure point under a burst test would be typically under 200 psi (about 1.4 MPa), more typically at about 180 psi (about 1.2 Mpa), and failure would occur along the roll or lock seam. When constructed according to principles described herein, in certain preferred arrangements, the failure of the cartridge 40 under a burst test will occur at over 300 psi (about 2.10 MPa), typically over 400 psi (about 2.80 MPa), and in one example, at about 500–800 psi (about 3.4–5.5 MPa), e.g. about 720 psi (about 5.0 MPa).

Still in reference to FIG. 3, the filter element 54 includes filter media 120 bounded by an inner liner 122. The media 120 also extends between a first end cap 124 and a second end cap 126. A variety of media configurations and materials can be used for media 120. The particular configuration shown is generally cylindrical with the media defining interior volume 78. For the arrangement shown, media 120 comprises a conventional, cylindrical, pleated filter media potted within end caps 124, 126. In one example, the specific media 120 usable in these arrangements is resin impregnated cellulose media. In another example, the media 120 can be pleated synthetic glass fiber filter medium, which is coated and corrugated to enhance performance in ambient air-oil mist conditions. The synthetic glass fiber filter media may be coated with a low surface energy material, such as an aliphatic fluorocarbon material, available from 3M of St. Paul, Minn. In another example, the media 120 can be non-pleated depth media.

The inner liner 122 preferably is constructed of a non-metal material, in particular, a hard rigid plastic. In the specific embodiment shown, the inner liner 122 comprises glass-filled nylon. Note that the inner liner 122 defines a plurality of apertures or flow ports 128 between a series of protecting hoops 130. The hoops 130 are supported by a plurality of (typically about 4) longitudinal members 132. The longitudinal members 132 extend the length of the inner liner 122 between the first and second end caps 124, 126. Note that the hoops 130 extend or project from the longitudinal members 132. These projections 134 prevent undue amounts of filter media 120 from direct contact with solid regions of the inner liner 122. In certain prior art filter liners that do not have projections, the filter media that directly interfaces with the solid portions of the inner liner are dead, unused regions of filter media because of blockage by the inner liner. In these prior art arrangements, this masked area of filter media permits less fluid flow through and increases the restriction and shortens the life of the filter media. In the embodiment shown in FIG. 3, in contrast, the projections 134 on each of the hoops 130 decreases the relative amount of masking, as compared to prior art inner liners. When constructed according to principles described herein, the inner liner 122 will mask only at the tips of the projections 134. This will mask no greater than about 35%, typically about 25–30 % of the media 120.

Preferably, the inner liner is constructed to have an open area of at least 30 about 65%, no greater than about 80%, and typically about 70–75%. Each of the hoops 130 will be at least 0.5 mm, no greater than about 5 mm., and typically about 1–3 mm. in thickness. Each of the projections 134 extends a distance beyond an outermost edge of the longitudinal members 132 of at least about 1 mm., no greater than about 10 mm. and typically about 3–5 mm.

Preferably, the filter element 54 also includes an outer liner 138. The outer liner 138 preferably extends between the first and second end caps 124, 126. The outer liner 138 may comprise a variety of materials, such as expanded or extruded plastic sleeve adhesive beads, or fiberglass strand reinforced resin spiral.

Still in reference to FIG. 3, the preferred first end cap 124 defines an open aperture 142 for permitting liquid flow communication with the interior volume 78 of the filter element 54. The open aperture 142 includes an inner, annular surface 144. The inner, annular surface 144 provides a sealing surface to engage and abut the outer, annular surface 82 of the neck 80. Preferably, the open aperture 142 has a smaller diameter than the outside diameter of the neck 80. Therefore, when the filter element 54 is positioned over the neck 80, there is an interference fit between the open aperture 142 and the neck 80. The engagement between the annular surface 144 of the end cap 124 and the outer annular surface 82 of the neck 80 forms a radially directed seal 146.

In order to create the seal 146, the first end cap 124 should be constructed of a compressible, moldable material. In preferred embodiments, the first end cap 124 is constructed of urethane or acrylic.

The first end cap 124 also includes axially extending bumps or projections 150. Typically, there are at least about three projections 150 extending from an outer surface 152 (that is, the surface remote from the media 120). The projections 150 are constructed and arranged to abut or engage the baffle plate 58. In the particular construction shown in FIG. 3, the projections 150 engage the channel 94 on a side 154 opposite from the side in which the seal member 92 engages. The projections 150 help to seat and appropriately orient the filter element 54 inside of the can 56. The projections 150 also create a passage to aid fluid flow between the end cap 124 and the baffle plate 58. The projections 150 typically project at least about 0.080 in. (about 2.0 mm), no greater than about 0.25 in. (about 6.4 mm), and typically about 0.10–0.15 in. (about 2.5–3.8 mm) above the outer surface 152 of the first end cap 124.

The filter element 54 further includes structure for helping to radially center the filter element 54 within the can 56. In the embodiment shown, the centering structure includes radially projecting bumps or projections 156 extending radially from the filter element 54. The projections 156 can extend from a variety of regions of the filter element 54, including either one of the first and second end caps 124, 126. In the particular embodiment shown in FIG. 3, the projections 156 radially extend from the second end cap 126. Typically, there will be at least two radially extending projections 156, and usually about 3–6 projections 156. The projections 156 radially abut and engage the inside surface 102 of the wall 60. It can be seen in FIG. 3 that the second end cap 126 is sized such that the regions 158 of the end cap 126 that do not have projections 156 are spaced from the inside surface 102 of the wall 60 to permit fluid flow therearound.

The filter element 54 further includes a bypass valve assembly 160. The bypass valve assembly 160 allows for unfiltered fluid flow to bypass the media 120, in case of clogged filter media or cold start surges. This ensures a steady flow of fluid to downstream equipment and prevents cavitation of pumps or other downstream equipment.

The bypass valve assembly 160 can be constructed in a number of configurations and arrangements. For example, U.S. Pat. Nos. 5,395,518; 3,297,162; 5,037,539; and 4,883,083, the complete disclosures of each which are incorporated herein by reference, show a variety of bypass valve arrangements.

In the arrangement shown in FIG. 3, the bypass valve assembly 160 includes a valve head 164 compressed against a valve seat 166 by a biasing member 168, in particular, a spring 170. The bypass valve assembly 160 includes a rigid structural member 172 to support the filter element 54 against the end wall 62 of the can 56. The rigid structural member 172 forms a tubular surrounding wall 174 that includes a plurality of inlet ports 176. The rigid structural member 172 also defines the valve seat 166 against which the valve head 164 is compressed.

In a forward flow system, if the filter media 120 becomes clogged and the differential pressure across the filter media 120 exceeds the force exerted by the spring 170, the valve head 164 will move away from the valve seat 166 into the interior 78 of the filter element 54. This will permit fluid to bypass the filter media 120 and flow through a port 178 defined by the valve seat 166.

Note that there is no other biasing mechanism or spring between the filter element 54 and the end wall 62 of the can 56 (i.e., it is a spring-free cartridge 40). Preferably, the only structure between the filter element 54 and the end wall 62 is the rigid structural member 172 of the bypass valve assembly 160 (i.e., the filter element 54 is supported by a springless member).

In the embodiment shown in FIG. 3, the bypass valve assembly 160 is press fit by interference fit into an aperture 180 defined by the second end cap 126. This permits convenient and inexpensive manufacturing and assembly techniques. In addition, if a bypass valve is not desired, a solid plug can be easily substituted, to provide the same function of the rigid, structural member 172.

C. Example Assembly Methods and Techniques

The arrangement depicted in FIG. 3 lends itself to convenient, quick, and inexpensive assembly techniques. In general, the cartridge 40 is assembled as follows:

Filter media 120 is fanned around the inner liner 122 and potted or molded within the first and second end caps 124, 126. This forms the filter element 154. The bypass valve assembly 160 is then press fit and secured, by way of interference fit, into the aperture 180 of the second end cap 126. Next, the neck 80 of the baffle plate 58 is inserted into the open aperture 142 of the first end cap 124. This forms radially directed seal 146 between the neck 80 and the first end cap 124.

Next, the filter element 54 having the valve assembly 160 and the baffle plate 58 secured thereto is inserted into the interior 64 of the can 56 until the rigid structural member 172 of the valve assembly 160 engages the end wall 62 of the can 60. This is also the point where the projections 150 on the first end cap 124 engage the side 154 of the channel 94 of the baffle plate 58. The inside surface 102 of the wall 60 is engaging the outer annular surface 100 of the baffle plate 58. This region is then laser welded, according to certain preferred laser welding techniques described below, to form the laser welded connection or seam 110.

The cartridge 40 is then secured to the filter head 42 by way of conventional techniques, such as spinning-on along threads 81.

Preferred assembly techniques as those described herein aid in reducing the effects of tolerance stack up. In other words, many preferred assembly techniques described herein allow for the insertion of the filter element 54 into the can 56, until the filter element 54 bottoms out on the end wall 62 of the can 60. The baffle plate 58 can then be pushed into the can 60 until the projections 150 abut and engage the baffle plate 58. It should be appreciated this lends to flexibility. If tolerances are at extremes, the baffle plate 58 will typically be able to account for the differences by being able to be adjusted relative to its position in the can 56.

In operation, liquid to be filtered flows through the port 46 (FIG. 2) in the filter head 42, and through the apertures 86 in the baffle plate 58. The fluid is prevented from flowing directly to the interior 78 of the filter element 54 due to radially directed seal 146. The liquid flows through the filter media 120, into the interior 78, out through the aperture 76 of the baffle plate 58, into the filter head 42, and out through the port 50 (FIG. 2).

If the filter media 120 becomes clogged, the liquid will flow through the ports 176 in the valve assembly 160 and move the valve head against the spring 170 away from the valve seat 166. The liquid will then flow directly to the interior 78 of the filter element 54, and exit through the aperture 76, flow to the filter head 42 and exit through the port 50.

Note that the preferred cartridge 40 lacks a spring between the end wall 62 of the can 60 and the element assembly 54. Also note that there is no additional gasket required between the element assembly 54 and the baffle plate 58. This contributes to a more convenient and less expensive cartridge 40, as compared to prior art cartridges.

In addition, the use of the laser welded seam 110 eliminates use of a roll or lock seam; in preferred constructions, the use of the laser welded seam improves the burst strength and impulse fatigue strength. In preferred constructions, there is no gasket retainer. Thus, the problem in certain existing arrangements of projection welds between the baffle plate and the gasket retainer breaking is eliminated.

D. The Embodiment of FIGS. 4 and 5

Figure 4:
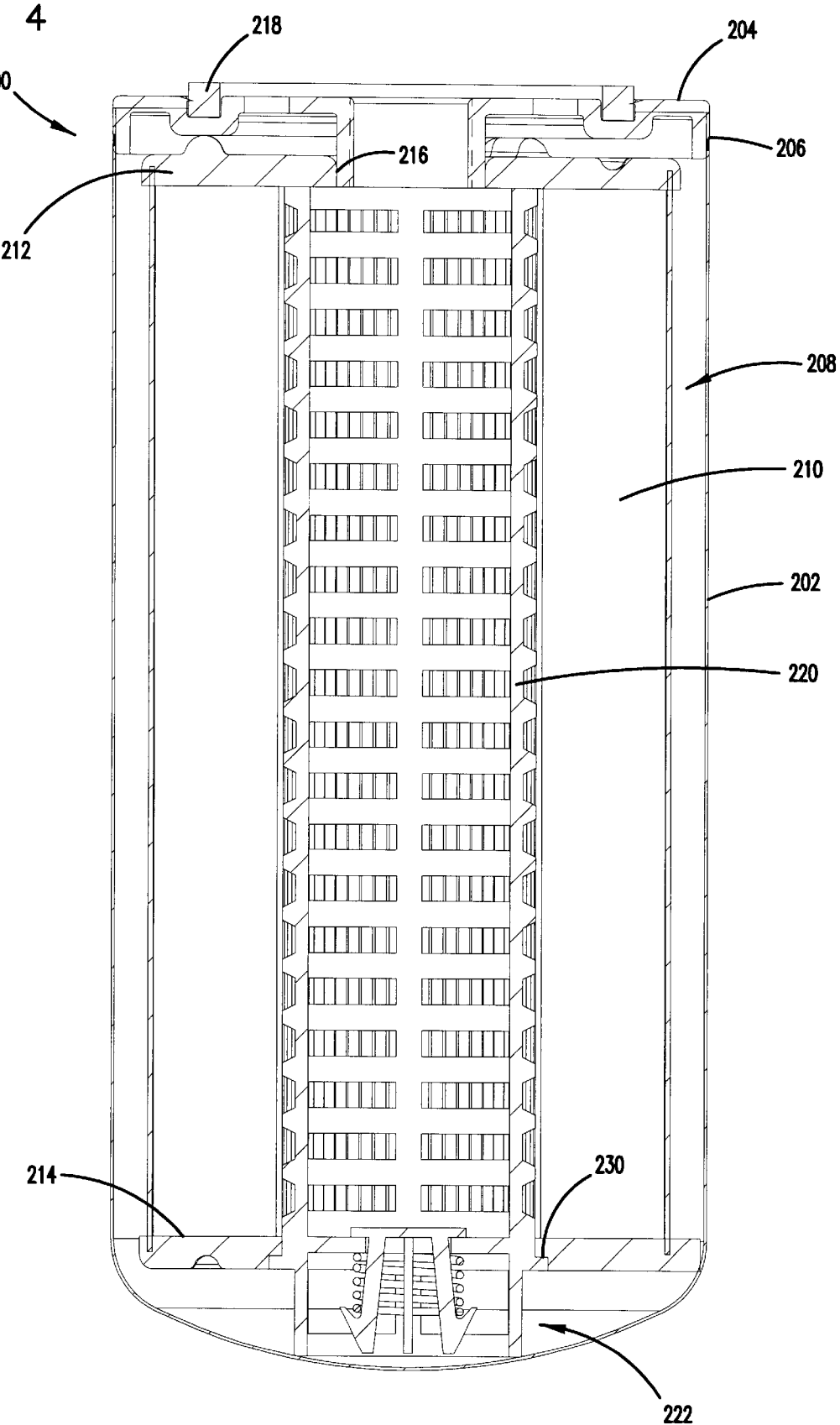
FIG. 4 is a schematic, cross-sectional view analogous to the view depicted in FIG. 3 and depicting an alternative embodiment of a filter cartridge.
Figure 5:
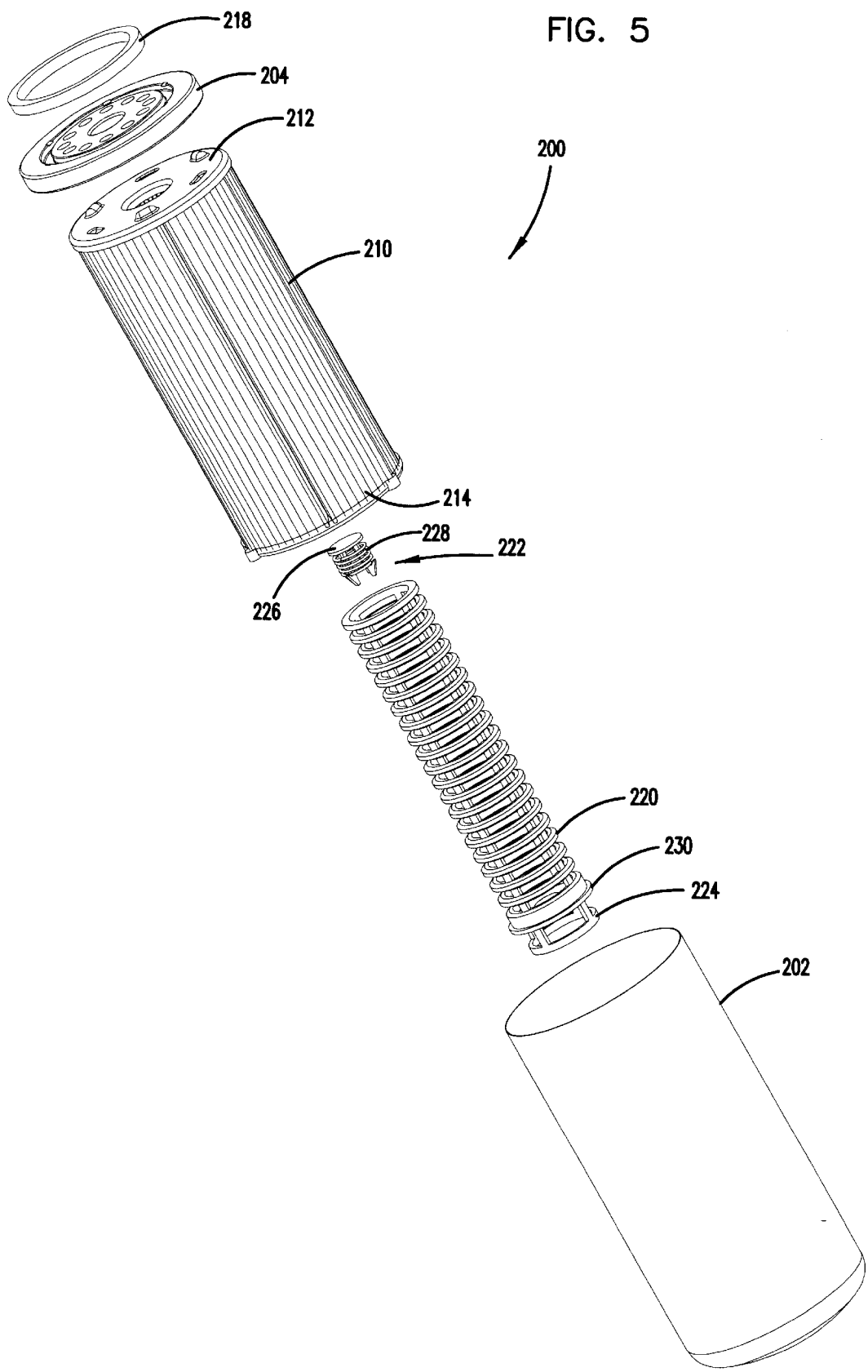
FIG. 5 is an exploded, perspective view of the liquid filter cartridge depicted in FIG. 4.

FIGS. 4 and 5 depict an alternative embodiment of a filter cartridge at 200. Filter cartridge 200 is constructed analogously as filter cartridge 40 (FIG. 3), with the exception of the inner liner and the bypass valve assembly, as described below.

The filter cartridge 200, as with the filter cartridge 40, includes a can 202, a baffle plate 204, and a laser welded seam 206 securing the baffle plate 204 to the can 202. Inside of the can 202 is a filter element 208, including filter media 210 extending between first and second end caps 212, 214. There is a radially directed seal 216 between the first end cap 212 and the baffle plate 204. A sealing member 218 is held by the baffle plate 204 by way of interference fit. Each of these features is analogous to those described, in conjunction with FIG. 3.

In this embodiment, the inner liner 220 is integral with the bypass valve assembly 222.

Attention is directed to FIG. 5. FIG. 5 is a perspective, exploded view of the filter cartridge 200 of FIG. 4. It can be seen in FIG. 5 that the rigid structural member 224 of the bypass valve assembly 222 is molded with and is an integral part of the inner liner 220.

To assemble the cartridge 200, the filter media 210 is potted or molded within the first and second end caps 212, 214. The valve head 226 and spring 228 is inserted into the rigid structural member 224 and operably positioned therein.

Next, the inner liner 220, including the rigid structural member 224 that is integral with it, is inserted into the openings defined by the first and second end caps 212, 214. The inner liner 220 engages the first end cap 212, while a shoulder 230 on the inner liner 220 is press fit by way of interference fit into the second end cap 214 to secure the inner liner 220 and bypass valve assembly 222 to the second end cap 214. This filter element construction 208 is then assembled into the cartridge 200, analogously as described above in connection with FIG. 3.

E. The Embodiment of FIG. 6

Figure 6:
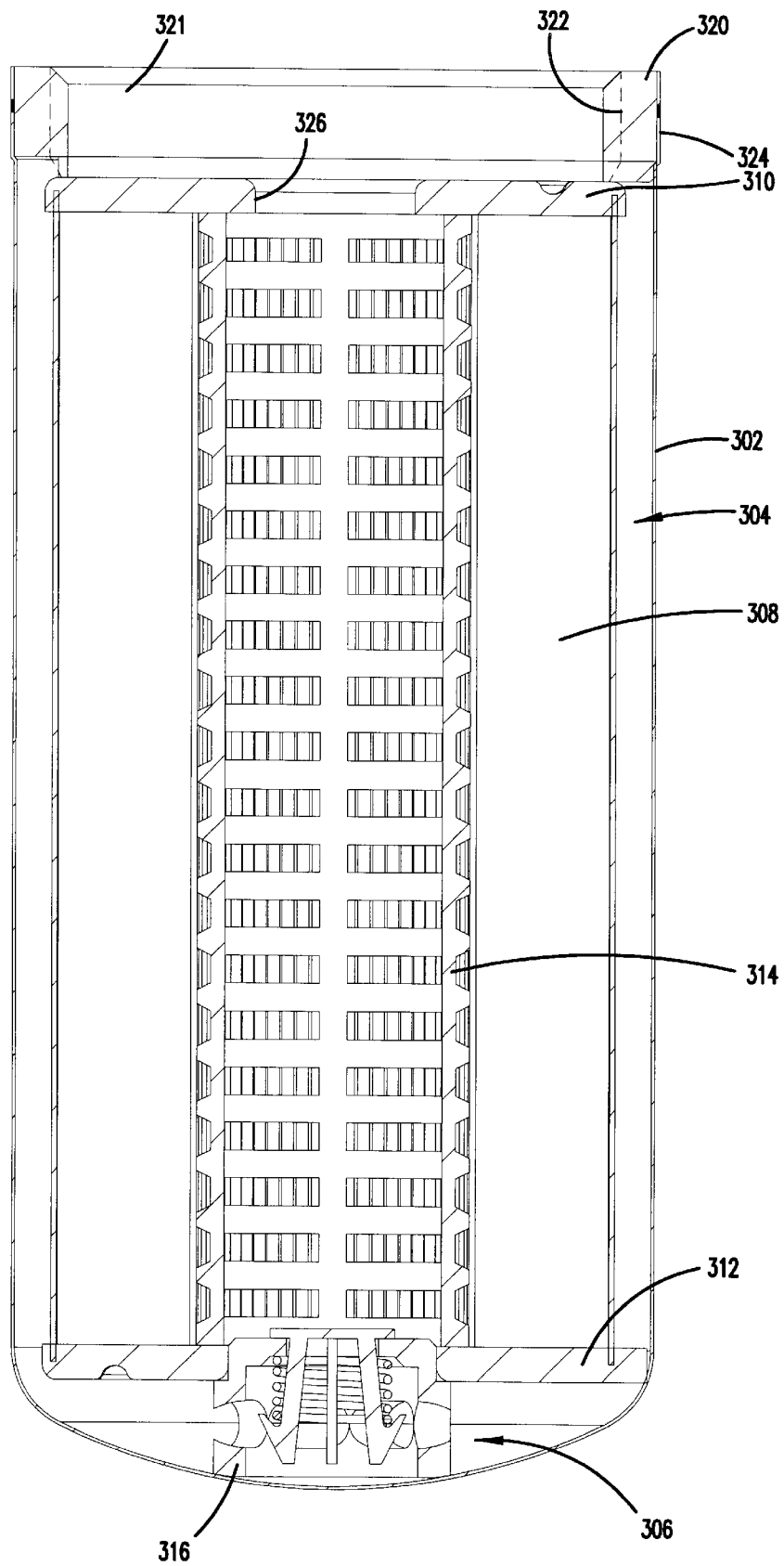
FIG. 6 is a schematic, cross-sectional view analogous to the views shown in FIGS. 3 and 4 and showing another embodiment of a filter cartridge.

FIG. 6 illustrates a schematic, cross-sectional view of another embodiment of a filter cartridge 300. Filter cartridge 300 is constructed analogously as filter cartridge 40, with the exception of the baffle plate. The filter cartridge 300 includes a can 302, a filter element 304, and a bypass valve assembly 306. The filter element 304 includes filter media 308 extending between first and second end caps 310, 312. An inner liner 314 is potted or molded within the first and second end caps 310, 312. A rigid structural member 316 is separate from the inner liner 314 and is press fit into the second end cap 312.

The first end cap 310 is generally planar and flat, and does not have axial projections, such as projections 150 (FIG. 3).

There is a baffle plate at 320. This is a "wide mouth" baffle plate and defines an inner rim 321 having threads 322. The baffle plate 320 is secured to the can 302 by way of a laser welded seam 324. The baffle plate 320 can have a thickness of typically 0.3–0.5 inches (about 7.6–12.7 mm), and typically not greater than about 3 inches (about 76 mm).

This type of filter cartridge 300 is for threading onto a particular type of filter head assembly different than that described above for FIGS. 3 and 4. The filter head assembly that this embodiment would engage separates the unfiltered fluid from the filtered fluid by way of ports and seals in the filter head itself. This type of filter head assembly is described in U.S. Pat. No. 5,342,519, which patent is herein incorporated by reference. When the cartridge 300 is threaded onto the filter head assembly, the first end cap 310 will form a radially directed seal between the outer, annular sealing surface 326 of the first end cap 310 and an appropriate tubular member in the filter head. Alternatively, an axially directed seal may be formed, as described below.

F. Axially Sealing System: the Embodiment of FIG. 14

Figure 14:
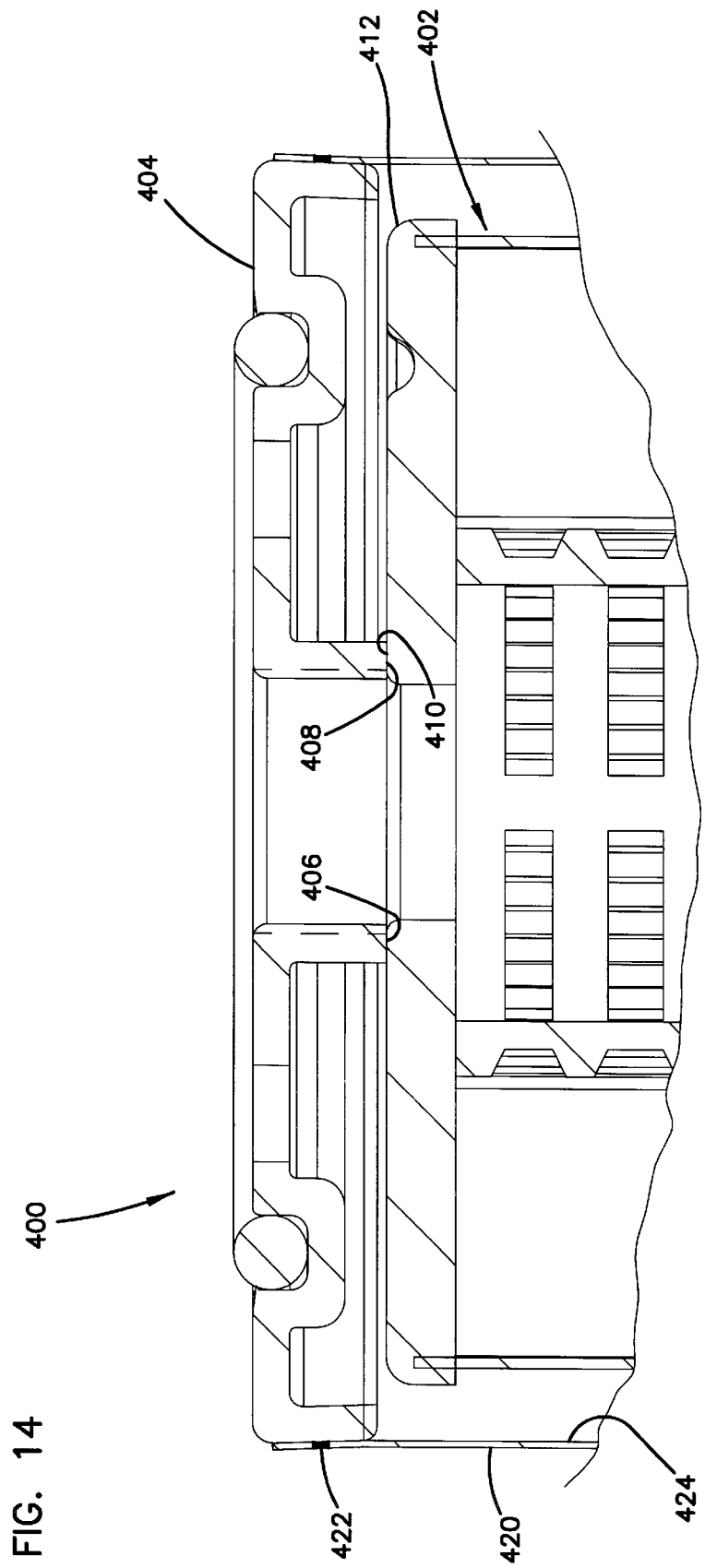
FIG. 14 is a fragmented, enlarged, cross-sectional view of an alternative embodiment of an inner seal arrangement usable in a liquid filter cartridge.

FIG. 14 illustrates an enlarged, fragmented, cross-sectional view of another embodiment of a filter cartridge 400. Filter cartridge 400 is constructed analogously as filter cartridge 40, with the exception of the manner in which the filter element 402 seals to the baffle plate 404. Instead of a radially directed seal, such as seal 146 in FIG. 3, there is a face seal or axially directed seal at 406. In this embodiment, the seal 406 is formed between an axial surface 408 of the baffle plate 404 and an axial surface 410 of an end cap 112.

As with the embodiment of FIG. 3, there is an outer steel can 420 that is secured to the baffle plate 404 at a laser weld 422.

During assembly, the filter element 402 is inserted into an interior 424 of the can 420. The baffle plate 404 is placed over the opening to the can 420, and inserted until the axial surface 408 abuts and engages the axial surface 410 of the end cap 412. After that, the can 420 is secured to the baffle plate 404 by way of laser welding techniques, as described below.

G. Laser Welding Techniques. FIGS. 9–13

As described above, preferably the baffle plate 58 is secured to the can 56 by way of laser welding to result in laser welded seam 110. When welding the can 56 to the baffle plate 58, in particular when the can 56 and baffle plate 58 have different cross-sectional wall thicknesses, one needs to take into account the changes in shape due to heat transfer. If the thickness between the can 56 and baffle plate 58 differ, this can result in gaps between the baffle plate 58 and can 56 due to thermal growth. The power output of the laser will depend upon: the total thickness of the two parts to be welded together; and the required welding speed (inches per minute). In preferred assemblies, the laser welding technique will allow for constructing at least 2000 filter assemblies 26 per hour. In typical, preferred filters, the filter assemblies 26 will have a diameter of at least about 3 and ⅝ths inch (92 mm) (although, in many typical embodiments, the diameter can be smaller) and a circumference of about 11.4 inches (about 289 mm). In order to construct 2000 filters per hour, there needs to be at least 380 inches/minute (about 9.7 m/min) of welding; typically, at least 400 inches/minute (about 10.2 m/min) of welding, when machine set-up time, e.g., loading and unloading is taken into account.

In certain constructions, cans 56 having a thickness of between about 0.015–0.020 inch are to be welded to baffle plate 58 of considerably more thickness, typically at least 200%, more typically at least 400%, and in some examples over 500% thicker than the thickness of the can 56. For example, the baffle plate 58 typically has a thicknesses of about 0.102–0.105 inch (about 2.6–2.7 mm). In these examples, the baffle plate 58 is about 510–580% of the thickness of the can 56. Typically, the baffle plate 58 will be no more that 1000% of the thickness of the can 56. One method for securing the baffle plate 58 to the can 56 by way of laser welding is illustrated in FIG. 9.

Figure 9:
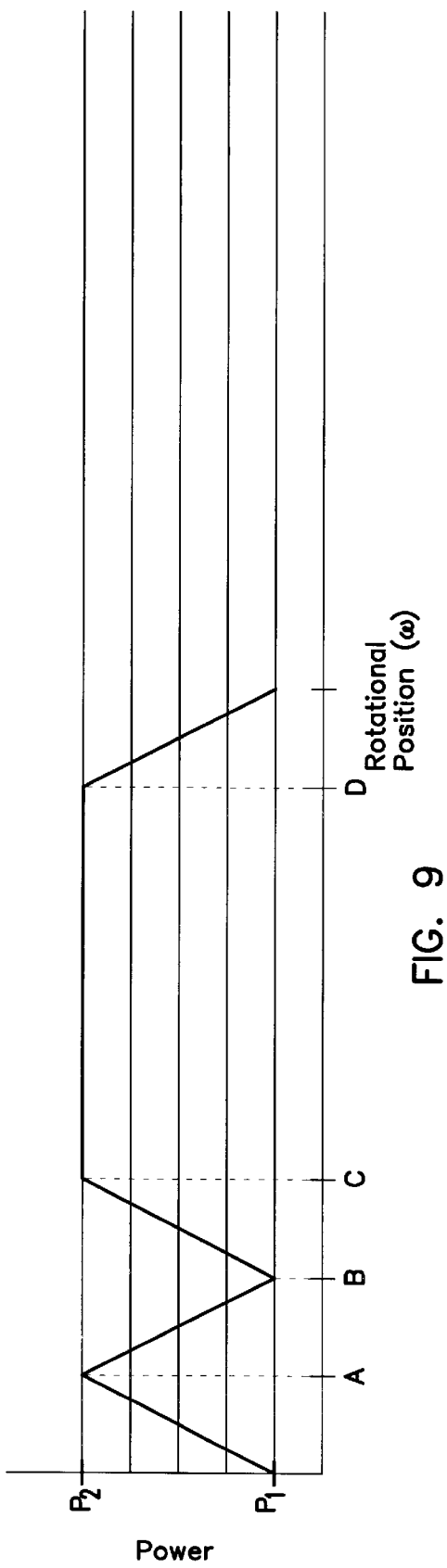
FIG. 9 is a graph illustrating an embodiment of a laser welding technique for making the liquid filter cartridge of FIGS. 2–6.

In the embodiment of FIG. 9, a plurality of tacks or stitches between the can 56 and baffle plate 58 are initially applied. Preferably, the tacks are spaced apart from each other sufficient to hold the baffle plate 58 to the can 56 and prevent a gap from forming between the can 56 and baffle plate 58.

In the embodiment shown in FIG. 9, there are two tacks formed at points A and C. After the tacks are formed at A and C, the entire annular surface 100 is laser welded at full power for 360° to result in the laser welded seam 110.

In FIG. 9, the laser weld is initially started up at a power P1. This power, if welding at a speed of at least 400 inches/min, is typically less than 2 kW, typically at least 0.5 kW, and typically about 1–1.5 kW (e.g., about 1.3 kW). The power is gradually increased from power P1 to power P2, while the can 56 and baffle plate 58 assembly are moved rotationally with respect to the laser weld beam. At rotational position A, the laser power will be at power P2. Power P2 is a power sufficient to make a stitch or tack between the can 56 and baffle plate 58. Typically, the power P2 is at least 3 kW, no greater than 6 kW, and typically about 3.3–3.5 kW (e.g., about 3.4 kW), when welding at a speed of about 400 inches/minute. When the speed is less, the power P2 required to make the tack can be lower. The rotational position of the can 56 and baffle plate 58 at point A will be about 90°.

The can 56 and baffle plate 58 continue to be rotated with respect to the laser beam, while the power is ramped down from P2 to P1 between points A and B. Typically point B will be a rotational position of about 160°–200°, i.e., about 180° (from the initial position; that is, about 90° from position A).

Between points B and C, the can 56 and baffle plate 58 continue to be rotated, while the power is again ramped up from power P1 to power P2. Point C will correspond to about 270° from the initial position (about 900 from point B). This will put another stitch or tack weld at point C. After reaching point C, the power is maintained at power level P2 until point D. Typically, the can 56 and baffle plate 58 are rotated at least a full 360° from point C to point D to provide a full, complete weld or seam 110 between the baffle plate 58 and can 56. Note that point D also corresponds to at least 6300 from the initial position. After point D, the power is again ramped down, and the welding assembly is complete.

Figure 10:
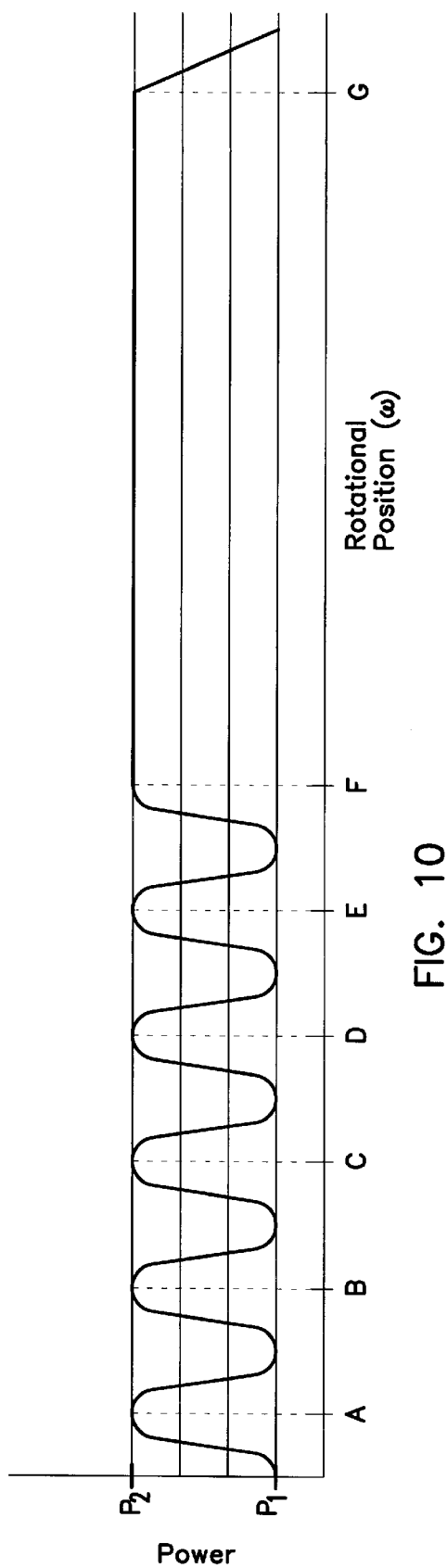
FIG. 10 is a graph showing another embodiment of a laser welding technique.

Another embodiment is illustrated in FIG. 10. In FIG. 10, power is once again ramped between levels P1 and P2, but in this embodiment, there are six tacks or stitches applied between the baffle plate 58 and can 56 at points A, B, C, D, E, and F. After these tacks A–F are formed, the baffle plate 58 and can 56 are rotated at least a full 360° to form a complete, uninterrupted, continuous laser welded seam 110. This occurs between points F and G. In certain preferred processes, each of the tacks A–F will be spaced about 200–400, typically about 30° apart from each other. In some preferred processes, the power oscillation between the initial position and point F will approximate a sine wave. In some preferred processes, the power level P1 will be close to 0, on the order of 100 watts. The power level P2 will be at least 3 kW, no greater than 6 kW, and typically 3.2–3.5 kW (typically about 3.4 kW), when welding at speed of at least 400 inches/minute. If the speed is lower, the power required may be lowered.

In another embodiment, there would be about four tacks or stitches applied between the baffle plate 58 and can 56. After the four tacks are formed, the baffle plate 58 and can 56 are rotated at least a full 360° to form a complete, uninterrupted, continuous laser welded seam 110. In this embodiment, each of the tacks will be spaced about 35–55°, typically about 45° apart from each other. The power oscillation in making the four tacks can, in certain processes, approximate a sine wave. The power will oscillate between a power close to 0, on the order of 100 watts, and up to at least 3 kW, no greater than 600 kW, and typically about 3.2–3.5 kW, when welding at a speed of at least 400 inches/minute. If the speed is lower, the power required may be lowered.

Figure 11:
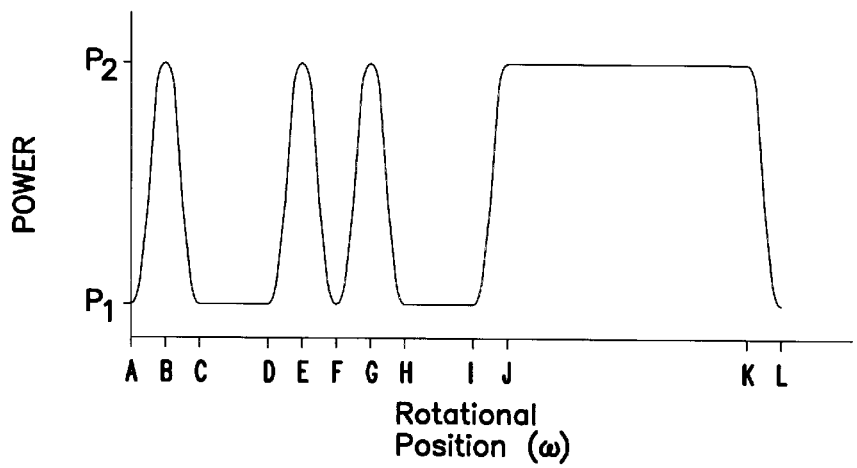
FIG. 11 is a graph showing another embodiment of a laser welding technique.

Another embodiment is illustrated in FIG. 11. In this embodiment, there is a first tack formed between the baffle plate 58 and the can 56 at point B. Power is then ramped down from P2 to P1, while the combination of the plate 58 and can 56 are rotated until point C, where the power is held steady at P1, until point D. Power is again ramped up to power P2 such that another tack is applied at point E. Power is again ramped down to level P1, while the combination plate 58 and can 56 is rotated to point F. The power is again ramped from level P1 to level P2 to apply a tack at points G. From point G, the power level is dropped until the baffle plate 58 and can 56 are rotated to point H. At point H, the power level is maintained at level P1 until reaching point I. From point I, the power level is ramped up to power P2 at point J. At point J, the power is maintained at level P2, to apply a continuous, uninterrupted weld or seam while rotating the baffle plate 58 and can 56 at least a full 360° until point K, at which point the weld is completed. In the embodiment of FIG. 11, point B is spaced about 35–55°, typically about 45° from the initial position point A. Point D is spaced, typically, about 160–200°, typically about 180° from the initial position Point A. Points B and C are spaced about 35–551, typically about 45° apart. Similarly, point E is spaced about 35–55°, typically about 450 from points D and F. Point G is spaced about 35–55°, typically about 45° from points F and H. Point I is spaced about 70–110°, typically about 90° from point H. Point J is spaced about 35–55°, typically about 450 from point I. Points J and K are spaced at least about 360° apart from each other.

In an alternate embodiment of FIG. 11, the relative power levels between the tack points (B, E, and G) and the continuous, uninterrupted weld seam (point J-K) are different. In particular, the power at the tack points can be less than the power during the continuous weld seam. In typical arrangements, the power during the tacking will be about 75–90% of the power during the continuous weld seam.

The methods of FIG. 11 can be summarized in the following table. This table represents certain, typical, convenient values. Variations from those below are contemplated:

| | TOTAL DEGREES FROM INITIAL POSITION | | | |
| --- | --- | --- | --- | --- |
| POINT | At Least | No Greater than | Typical range | For example |
| A | 0 | 0 | 0 | 0 |
| B | 0 | 120 | 35–55 | 45 |
| C | 40 | 200 | 80–100 | 90 |
| D | 100 | 260 | 170–190 | 180 |
| E | 120 | 270 | 215–235 | 225 |
| F | 180 | 350 | 260–280 | 270 |
| G | 220 | 360 | 305–325 | 315 |
| H | 280 | 500 | 350–370 | 360 |
| I | 360 | 580 | 440–460 | 450 |
| J | 400 | 600 | 485–505 | 495 |
| K | 700 | 900 | 845–865 | 855 |
| L | 710 | 1000 | 890–910 | 900 |

Figure 12:
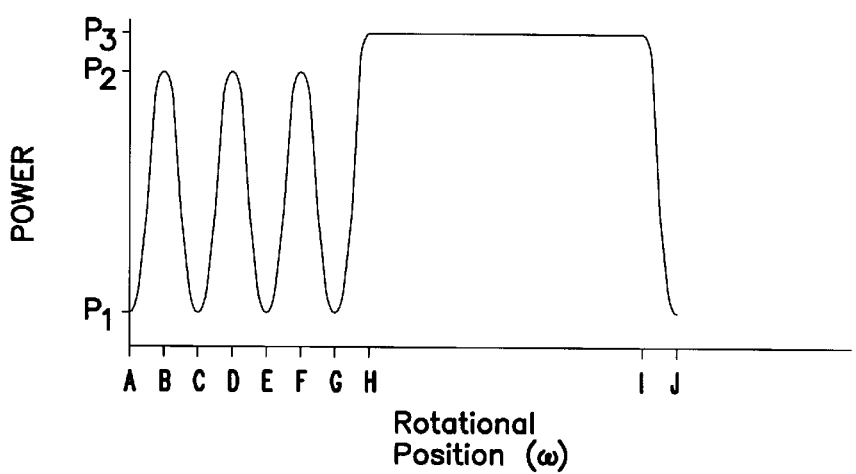
FIG. 12 is a graph showing another embodiment of a laser welding technique.

FIG. 12 illustrates another embodiment of a laser welding technique. In FIG. 12, there are tacks applied at points B, D, and F, while a fill, uninterrupted, continuous seam is applied between points H and I. In this embodiment, the tacks are applied, while the laser is at a power that is lower than the power of the continuous seam. In particular, the baffle plate 58 and can 56 combination is rotated at a slower speed while the tacking is occurring, versus a higher speed between points H and I when the continuous, uninterrupted seam is applied. The power is oscillated between the initial position A and point G between a power level P1 and a power level P2 in a pattern can approximate a sine wave. Other wave patterns may also be used. In the embodiment of FIG. 12, each of the tack or spot welds are spaced about 70–110°, typically about 90° apart. In preferred applications, each of the spaces between the initial position A, point B, point C, point D, and on up to point G is about 35–55°, typically about 45° apart. At point G, the power level is increased from level P1 up to level P3. Level P3 is a higher power than level P2. Typically, the power level P2 will be 75–95% of the power level P3. In typical operations, the level P3 will be about 3.2–3.5 kilowatts, while the level P2 will be about 2.9–3.1 kilowatts, when welding at a speed of at least 400 inches/minute.

Figure 13:
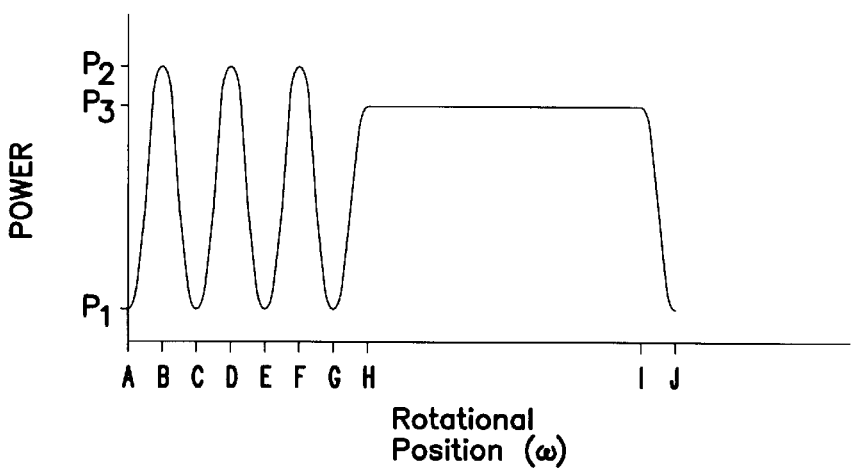
FIG. 13 is a graph showing yet another embodiment of a laser welding technique.

FIG. 13 illustrates another embodiment of a laser welding technique. In FIG. 13, the tack welds are applied while the baffle plate 58 and can 56 are rotated at a speed higher than the speed of rotation while applying the continuous, uninterrupted seam. Tack welds are applied at points B, D, and F, while a continuous, uninterrupted seam is applied between point H and I. Each of points A–H are preferably evenly spaced from each other, about 35–55° typically about 45°. The power is varied between point P1 and point P2, while applying the tacks at points B, D, and F. After point G, the baffle plate 58 and can 56 combination can be rotated at a slower speed to permit a joint to be welded at power level P3. In typical applications, when welding at a speed of at least 400 inches/minute, the power level P3, in this embodiment, will be between about 3.2–3.5 kilowatts, while the power level P2 will be about 105–110% of the power level P3, typically about 3.6–3.7 kilowatts.

The methods of FIGS. 12 and 13 can be summarized in the following table. This table represents certain, typical, convenient values. Variations from those below are contemplated:

| | TOTAL DEGREES FROM INITIAL POSITION | | | |
| --- | --- | --- | --- | --- |
| POINT | At Least | No Greater than | Typical range | For Example |
| A | 0 | 0 | 0 | 0 |
| B | 0 | 120 | 35–55 | 45 |
| C | 30 | 150 | 80–100 | 90 |
| D | 90 | 210 | 125–145 | 135 |
| E | 120 | 270 | 170–190 | 180 |
| F | 180 | 330 | 215–235 | 225 |
| G | 200 | 400 | 260–280 | 270 |
| H | 210 | 410 | 305–325 | 315 |
| I | 500 | 800 | 665–685 | 675 |
| J | 510 | 810 | 710–730 | 720 |

In general, it should be appreciated from the above discussion that the number of tacks applied between the baffle plate 58 and can 56 can vary between at least 1 tack, no more than about 16 tacks, and typically about 2–8 tacks. Preferably, the processes will have the tacks evenly spaced. In preferred processes, the tacks are formed by varying the power between a low power (on the order of 100 watts), up to a power sufficient to form a tack or spot weld at a fast enough speed (in these examples, at least 3 kW and a speed of at least 300 inches/minute, typically, at least 400 inches/minute). The power variance can be in the form of a saw-tooth wave, a square wave, a sine wave, and other such patterns. In preferred processes, after the plurality of stitches or tacks is applied, there will preferably be a complete, uninterrupted, continuous laser welded seam formed between the baffle plate 58 and the can 56 by rotating the baffle plate 58 and can 56 at least a full 360° relative to the laser beam at a steady power, sufficient to form a joint between the plate 58 and can 56. In the examples discussed herein, that power will typically be at least 3 kW, and typically about 3.2–3.5 kW. The rotation speed can be varied, to permit lower or higher laser power levels. The rotation speed may also be varied between tacks applied. That is, there can be one rotation speed during the welding of the tacks themselves, and a different rotation speed (typically, faster) in between the welding of the tacks. The speed may also be varied between the tack application and between the application of the continuous laser weld seam.

H. Specific Example Embodiment

The following section provides example dimensions of one specific embodiment. It should be understood that a variety of dimensions and configurations are contemplated.

The can 56 will have a length of at least a 100 mm, no greater than 500 mm, typically 150–300 mm, and in one example about 200 mm. The diameter of the can 56 will typically be at least 40 mm, no greater than about 150 mm, typically about 50–100 mm, and in one example about 90–95 mm.

The seal member 92 will have a diameter that is 5–25% smaller than the diameter of the can 56. Typically, the diameter of the seal member 92 will be on the order of 8–15% smaller than the diameter of the can 56. The diameter of the seal member 92 will typically be at least 30 mm, no greater than about 140 mm, typically about 50–100 mm, and in one example about 80–85 mm.

The filter element 54 will have a length between the first and second end caps 124, 126 that is typically at least 70%, no greater than 95%, and typically about 80–90% of the length of the can 56. The length will typically be at least about 50 mm no greater than about 300 mm, typically about 100–200 mm, and in one example about 160–180 mm.

There will typically be at least about 5 inlet apertures 86, no greater than about 25 apertures 86, typically about 8–15 apertures 86, and in one example 12 apertures 86.

The outlet 76 will have a diameter that is typically at least about 5 mm, no greater than about 50 mm, and typically about 10–30 mm.

The above specification, examples and data provide a complete description of the manufacture and use of the invention. Many embodiments of the invention can be made.

We claim:

1. A method of constructing a filter; the method comprising:
   (a) inserting a filter element into a metal can; the metal can having at least one open end and a first average cross-sectional wall thickness;
   (b) covering the one open end with a metal baffle plate; the baffle plate having a second average cross-sectional thickness;
      (i) the second average cross-sectional thickness being at least 200% of the first average cross-sectional wall thickness; and
   (c) securing the baffle plate to the can by laser welding.

2. A method according to claim 1 wherein:
   (a) said step of securing includes laser welding at least first and second, spaced tacks between the baffle plate and the can and then laser welding at least a 360° seam between the baffle plate and the can;
      (i) the first average cross-sectional wall thickness of the can being at least 0.008 inch; and
      (ii) the second average cross-sectional wall thickness of the baffle plate being at least about 0.08 inch.

3. A method according to claim 1 wherein:
   (a) said step of securing includes laser welding at least first and second, spaced tacks between the baffle plate and the can; the first and second tacks being spaced about 160°–200° apart.

4. A method according to claim 1 further including:
   (a) assembling the filter element by:
      (i) securing a tubular construction of filtering media between first and second opposite end caps; the first end cap having an inner, annular surface defining a first opening; and
      (ii) pressing a rigid structural member into the second end cap;
   (b) inserting a neck of the baffle plate into the first opening and forming a radially directed seal between the neck and the first end cap;
   (c) wherein said step of inserting includes placing the filter element in the can, until the rigid structural member abuts an end of the can; and
   (d) wherein said step of covering includes engaging the baffle plate against the first end cap.

5. A method according to claim 1 wherein:
   (a) said step of securing includes laser welding at a speed of at least 400 inches/minute.

* * * * *